US006032972A

United States Patent [19]

Dias

[11] Patent Number: 6,032,972

[45] Date of Patent: Mar. 7, 2000

[54] DECORATIVE BODY SHELL FOR WHEELCHAIRS

[76] Inventor: Stephen F. Dias, 14219 Hawthorne Ct., Fountain Hills, Ariz. 85268

[ * ] Notice: This patent is subject to a terminal disclaimer.

[21] Appl. No.: 09/118,435

[22] Filed: Jul. 17, 1998

Related U.S. Application Data

[63] Continuation-in-part of application No. 08/808,022, Mar. 3, 1997, Pat. No. 5,785,340.

[51] Int. Cl.[7] .............................. A63G 31/00; B62J 17/00

[52] U.S. Cl. .................... 280/304.1; 280/1.13; 280/1.23; 296/146.8

[58] Field of Search ................................ 280/47.38, 828, 280/827, 1.22, 47.4, 250.1, 304.1, 1.23, 1.13, 304.4; 180/11, 907; 296/177, 146.8, 147; D12/131, 133

[56] References Cited

U.S. PATENT DOCUMENTS

| | | | |
|---|---|---|---|
| D. 132,520 | 5/1942 | Tomasini | D12/10 |
| D. 321,335 | 11/1991 | Aoki et al. | D12/131 |
| 1,393,461 | 10/1921 | Steele | 280/1.23 |
| 1,403,451 | 1/1922 | Smith | 280/47.4 |
| 1,562,244 | 11/1925 | Morrill, Jr. | 280/1.23 |
| 2,710,659 | 6/1955 | Moederle | 280/304.1 |
| 2,775,462 | 12/1956 | Biasell | 280/1.23 |
| 2,822,214 | 2/1958 | Rivolta | 296/146.8 |
| 4,062,582 | 12/1977 | Youmans | 296/63 |
| 4,593,929 | 6/1986 | Williams | 296/77.1 |
| 4,809,804 | 3/1989 | Houston et al. | 180/65.5 |
| 5,785,340 | 7/1998 | Dias | 280/250.1 |

FOREIGN PATENT DOCUMENTS

| | | |
|---|---|---|
| 931928 | 8/1955 | Germany . |
| 195768 | 2/1958 | Germany . |

*Primary Examiner*—Anne Marie Boehler
*Attorney, Agent, or Firm*—Parsons & Goltry; Robert A. Parsons; Michael W. Goltry

[57] ABSTRACT

A device for improving the appearance of a wheelchair having a body shell attachable to the wheelchair frame to simulate the appearance of an automotive vehicle or the like.

3 Claims, 8 Drawing Sheets

DECORATIVE BODY SHELL FOR WHEELCHAIRS

The instant application is a continuation-in-part of applicant's copending application, Ser. No. 08/808,022, entitled DECORATIVE BODY SHELL FOR WHEELCHAIRS, filed Mar. 3, 1997, now U.S. Pat. No. 5,785,340.

BACKGROUND OF THE INVENTION

1. Field of the Invention

This invention relates to wheelchairs and is particularly directed to decorative body shells which are mountable on conventional wheelchairs to simulate automobiles and the like and which serve to enclose and protect the legs and lower torso of a person seated in the wheelchair to protect that person from injury due to collision, while leaving that person's upper body unenclosed and providing free access for that person to the wheels of the wheelchair to enable that person to freely manipulate those wheels.

2. Prior Art

As is well known, many thousands of people are confined to wheelchairs each year, due to illness, accident or other misfortune. When this occurs, a considerable amount of mental therapy is required to assist the victim in adjusting to such confinement. While such adjustment is a serious matter with all wheelchair patients, it is far more serious in the case of children, who often tend to develop severe inferiority complexes as a result of such confinement. Furthermore, wheelchairs are designed for function, rather than for esthetics, and the appearance of prior art wheelchairs is certainly not pleasing to the eye and even tends to have an appearance which is mentally depressing. Thus, prior art wheelchairs serve to provide mobility for non-ambulatory patients, however, the appearance of the prior art wheelchairs also serves as a constant reminder to the patients that they are disabled. These problems are especially aggravated for children when the wheelchair patients encounter other children playing in peddle-driven toy vehicles, such as cars, trucks, airplanes and the like. Unfortunately, most wheelchair patients cannot operate such peddle driven vehicles, even if they could manage to climb into and out of such toy vehicles. Thus, the wheelchair patients must simply sit by and watch, while other children enjoy such toys. Over the years, numerous improvements have been made to improve the functioning of wheelchairs and to provide accessories which would enhance the functionality of wheelchair patients. However, virtually nothing has been done to improve the appearance of the wheelchairs.

It is also well known that a person seated in a wheelchair is often subject to collision and possible serious injury to their legs, especially when maneuvering in close quarters and areas where other persons are likely to be inattentive. For example, when shopping in grocery stores and the like, it is common for other shoppers to stumble against the person in the wheelchair or to bump their shopping cart against the wheelchair occupant, which can cause serious injury to the wheelchair occupant's legs. Also, when attempting to reach a product on a nearby shelf, it is not uncommon for the wheelchair occupant to unintentionally dislodge one or more additional cans or packages, which can fall onto the wheelchair occupant's lap and cause injury. Similarly, in any public area, it is not uncommon for persons to stumble against the wheelchair occupant or for skaters or bicycle riders to collide with the wheelchair occupant causing possible serious injury to the wheelchair occupant's legs. Prior art wheelchairs do nothing to protect the occupant from such accidents. Thus, none of the prior art wheelchairs have been entirely satisfactory.

SUMMARY OF THE INVENTION

These disadvantages of prior art wheelchairs are overcome with the present invention and improved wheelchairs are provided which are pleasing in appearance and which serve to significantly improve the patient's self-image and to greatly decrease the patient's mental depression and to protect the patient's legs against possible injury due to collisions and the like.

These advantages of the present invention re preferably attained by providing body shells which are attachable to the wheelchair frame and which simulate the appearance of an automotive vehicle or the like and which serve to enclose the legs and lower torso of a person seated in the wheelchair to protect that person from injury due to collision, while leaving that person's upper body unenclosed and providing free access for that person to the wheels of the wheelchair to enable that person to freely manipulate those wheels.

Accordingly, it is an object of the present invention to provide a wheelchair which is attractive in appearance.

Another object of the present invention is to provide a wheelchair having an appearance which serves to enhance a patient's self-image.

An additional object of the present invention is to provide means to enhance the appearance of the wheelchair.

A further object of the present invention is to provide means for enabling a wheelchair to simulate the appearance of an automotive vehicle or the like.

A specific object of the present invention is to provide means for improving the appearance of a wheelchair comprising body shells which are attachable to the wheelchair frame and which simulate the appearance of automotive vehicles or the like.

These and other objects and features of the present invention will be apparent from the following detailed description, taken with reference to the figures of the accompanying drawings.

DETAILED DESCRIPTION OF THE PREFERRED EMBODIMENT

Figure 1:
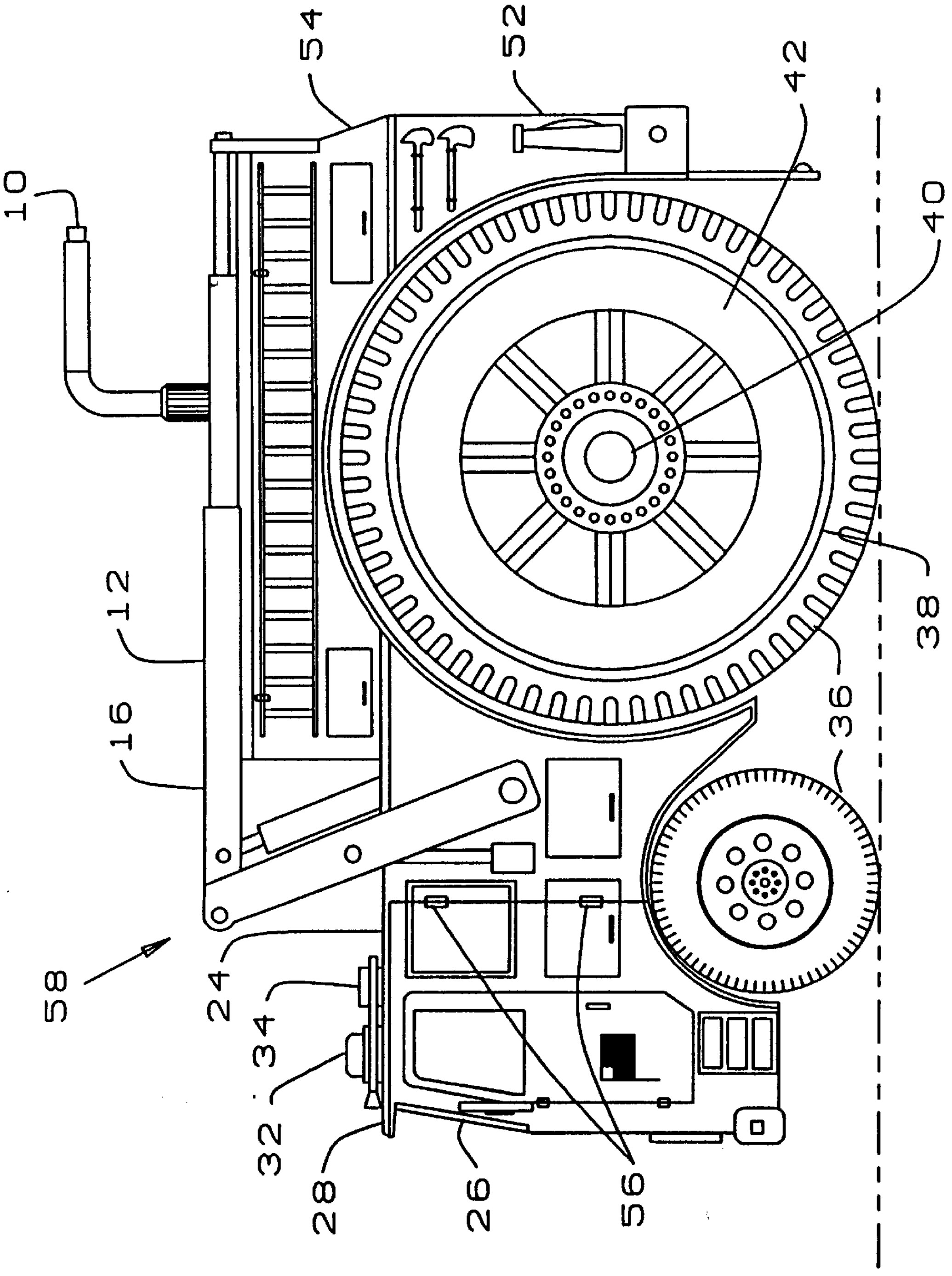
FIG. 1 is a side view of a wheelchair embodying the present invention.
Figure 2:
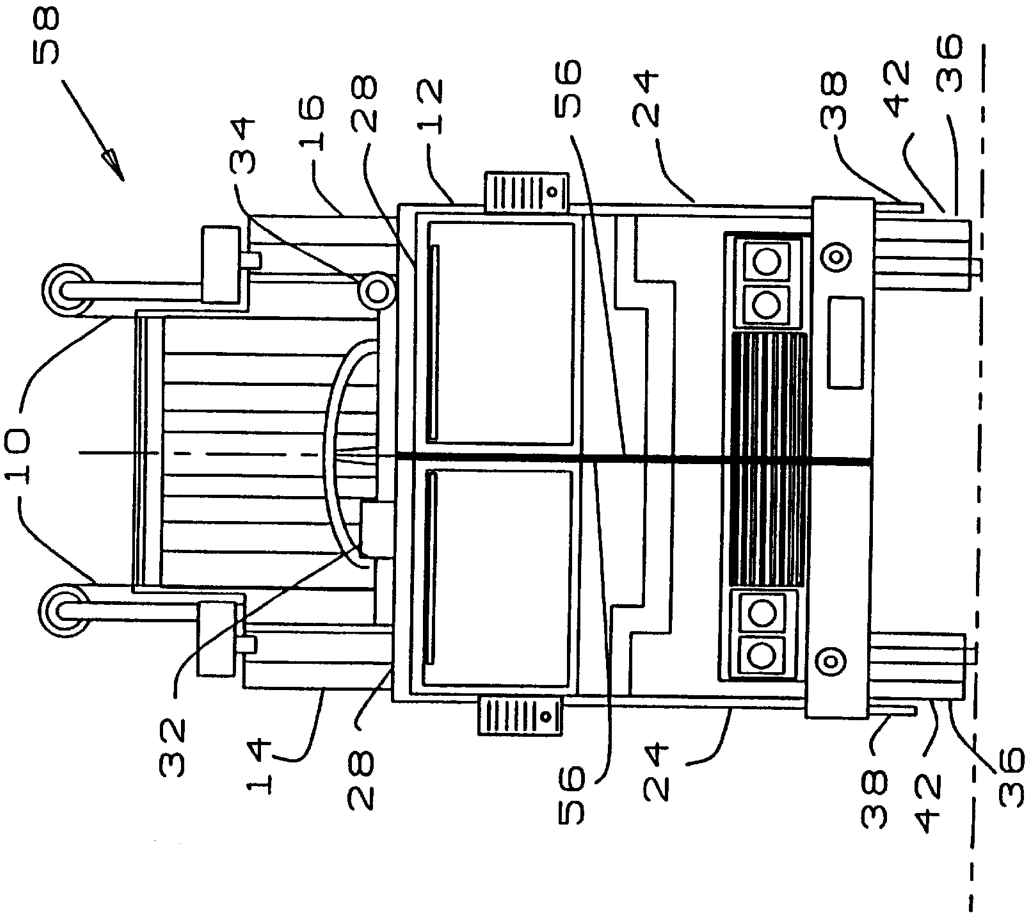
FIG. 2 is a front view of the wheelchair of FIG. 1.

In that form of the present invention chosen for purposes of illustration in the drawing, FIGS. 1–5 show a wheelchair, indicated generally at 10, enclosed within a decorative body shell 12 which simulates the appearance of an automotive vehicle, in this instance, a fire engine. As best seen in FIGS.

Figure 3:
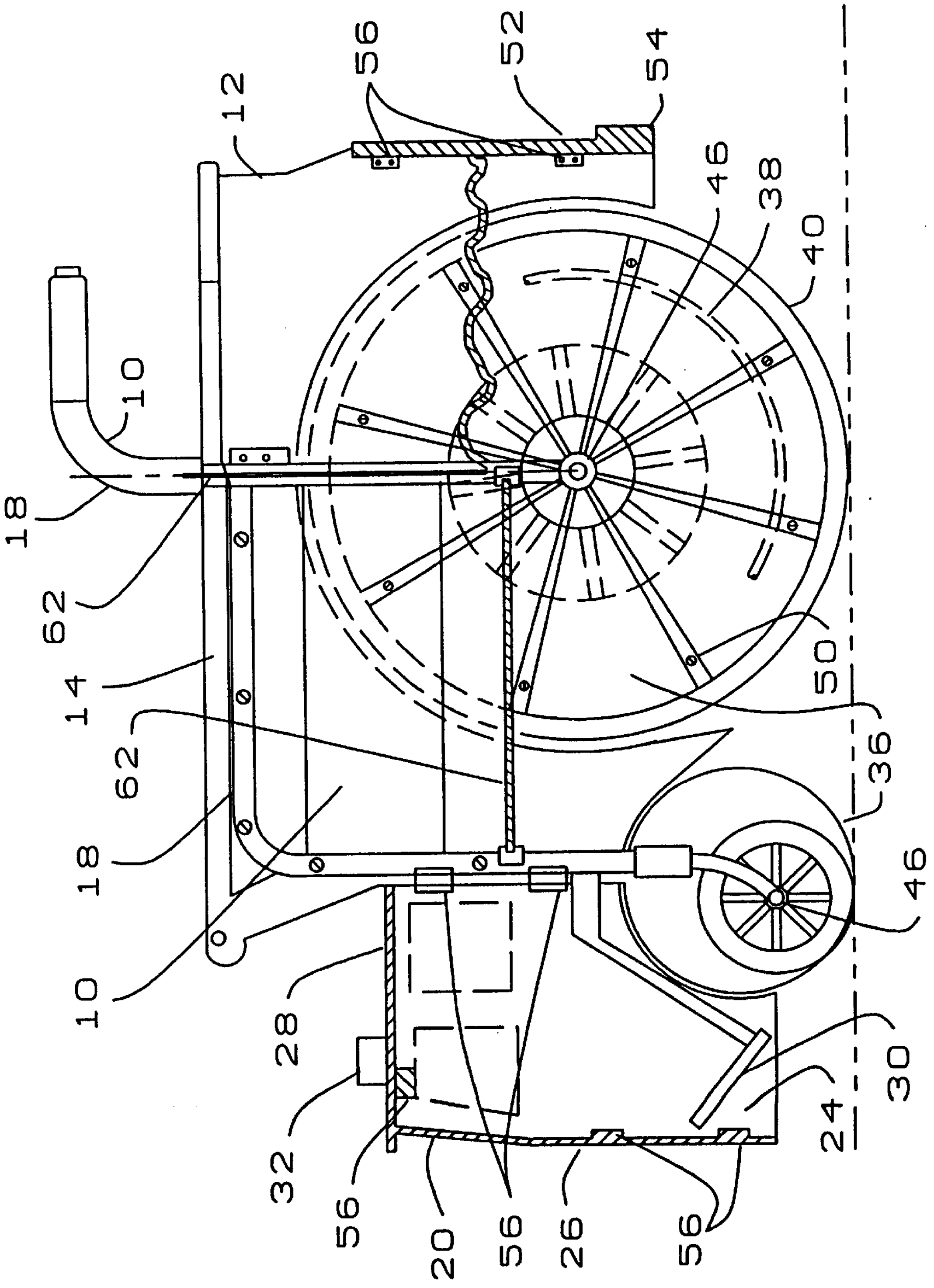
FIG. 3 is a longitudinal section thorough the wheelchair of FIG. 1.
Figure 4:
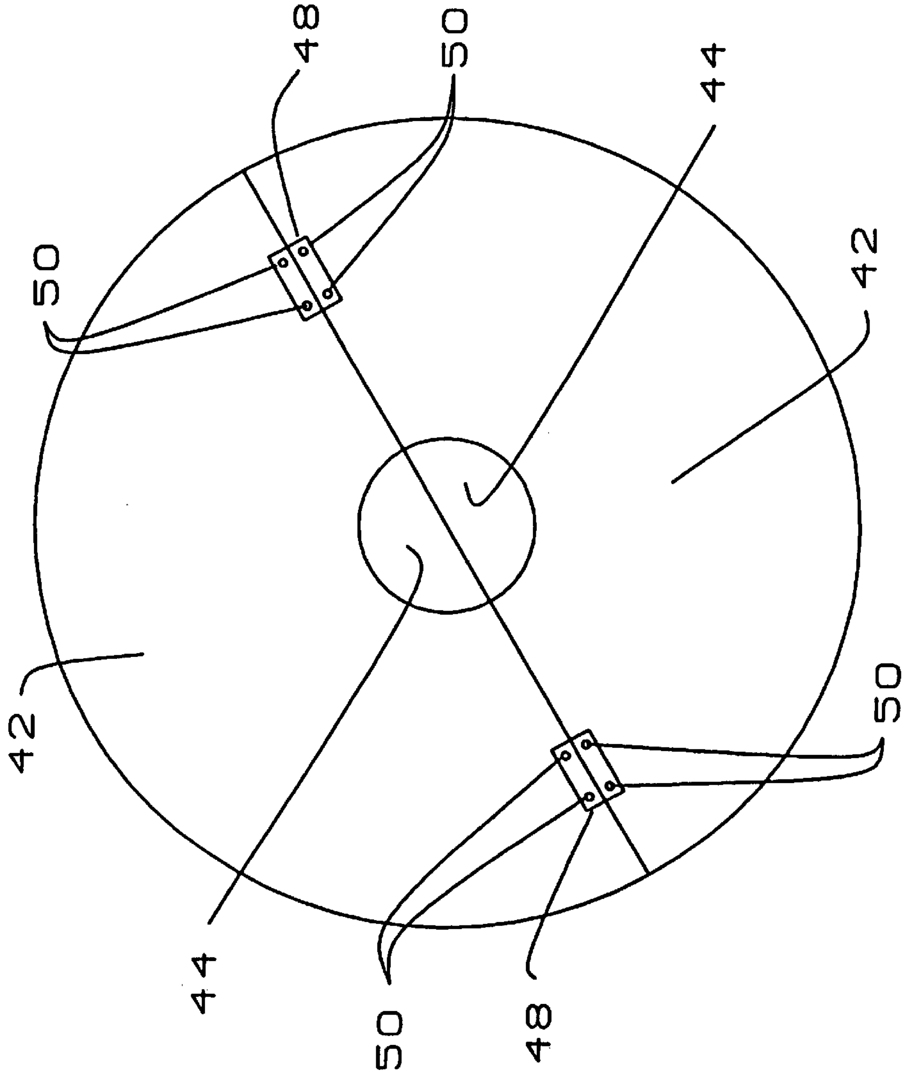
FIG. 4 is a rear view of one of the wheel covers of the body shell of FIG. 1.
Figure 5:
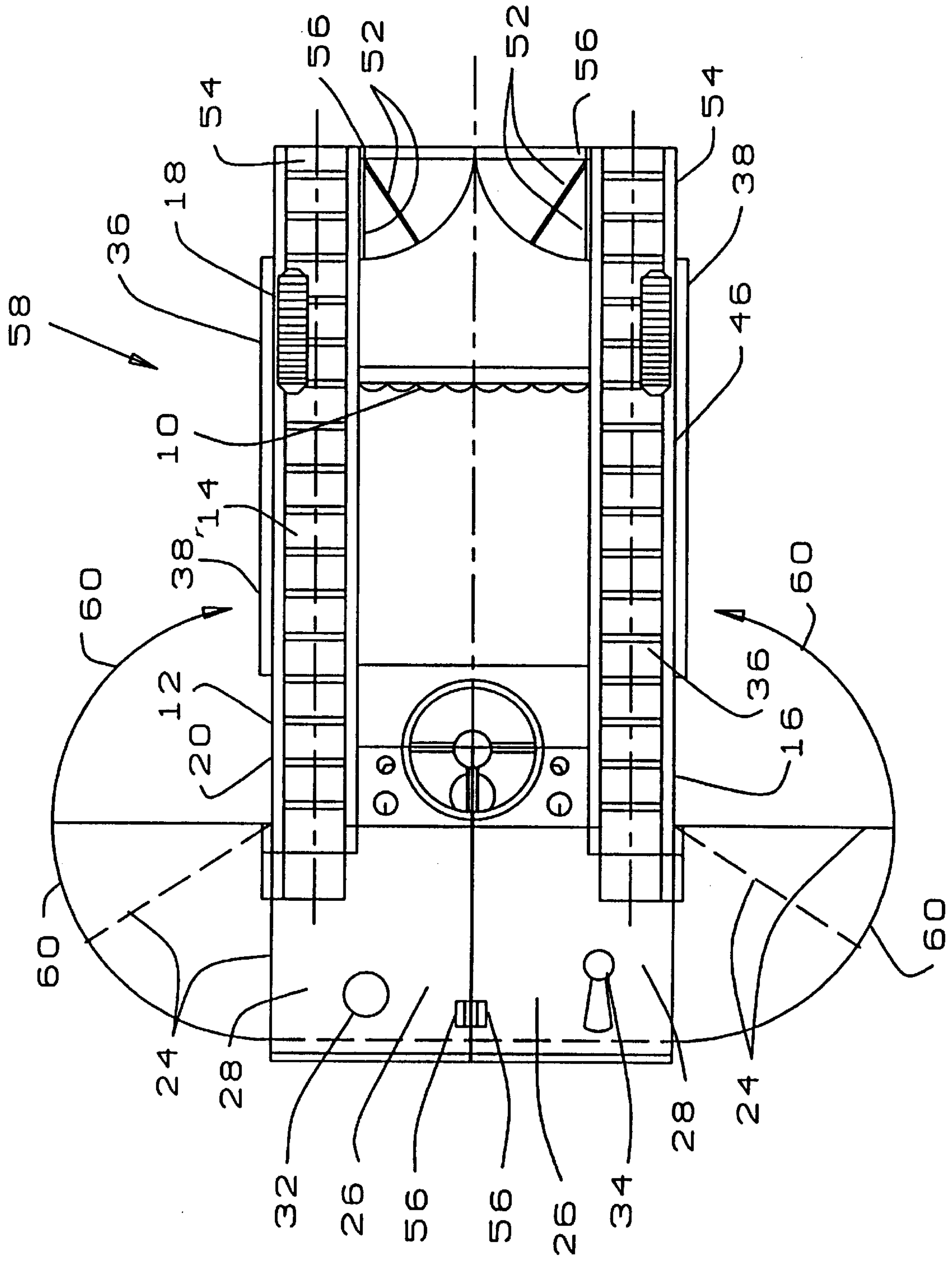
FIG. 5 is a top view of the wheelchair of FIG. 1.

3 and 5, the body shell 12 comprises a pair of side panels 14 and 16 which are secured to the frame 18 of the wheelchair 10 by suitable means, such as machine screws, bolts or the like, not shown. The side panels 14 and 16 may be flat sheet of material, such as wood, plastic, metal, fiberboard or the like. Preferably, however, the side panels 14 and 16 will be contoured to provide a more three-dimensional simulation of the desired appearance. Adjacent the front ends 20 and 22 of side panels 14 and 16, are hinged front sections 24, 26 and 28. Sections 24 are generally extensions of the side panels, 14 and 16, respectively, which are hingedly connected to the front ends 20 and 22 of the side panels 14 and 16 and which project beyond the footrest 30 of the wheelchair, as best seen in FIG. 3. Sections 26 are lateral components which are hingedly connected to the respective side panels 14 or 16 and which extend inwardly therefrom to simulate the grill and windshield of the vehicle. Sections 28 are horizontal components which are hingedly connected to the side panels 14 or 16 and which overlie the lateral sections 26 to simulate the hood or cab roof of the vehicle. If desired, suitable accessories, such as rotating lights 32, sirens 24 or the like may be mounted on the horizontal sections 28, as shown, and may be operable, if desired, by manual or electrical means, as is well known. Finally, wheel covers 36 may be provided, secured to the wheels 40, but sufficiently inside of the handwheels 38 to prevent interference with the patient's hands, when the patients is using the handwheels 38 to manipulate the wheelchair 10. As seen in FIG. 4, the wheel covers 36 are formed of two half-circular members 42 having central recesses 44 for fitting about the axle 46 of the wheelchair wheel 40. The wheel cover halves 42 are joined by suitable means, such as braces 48 secured to the members 42 by screws 50. Side panels 14 and 16 may also carry rear sections 52, which are hingedly secured to the rear ends 54 of the side panels 14 or 16 and extend inwardly to simulate the rear end of the vehicle. Preferably, suitable means, such as magnetic latches 56 will be provided to releasably connect the adjoining edges of the lateral sections 26, horizontal section 28 and rear sections 52 of side panel 14 to the corresponding members of side panel 16 to form a complete body shell, as indicated generally at 58, and, hence, to provide the appearance of an integral vehicle. Obviously, the exterior surfaces of the body shell 58 may be decorated, substantially as desired, to enhance the vehicle simulation.

Figure 6:
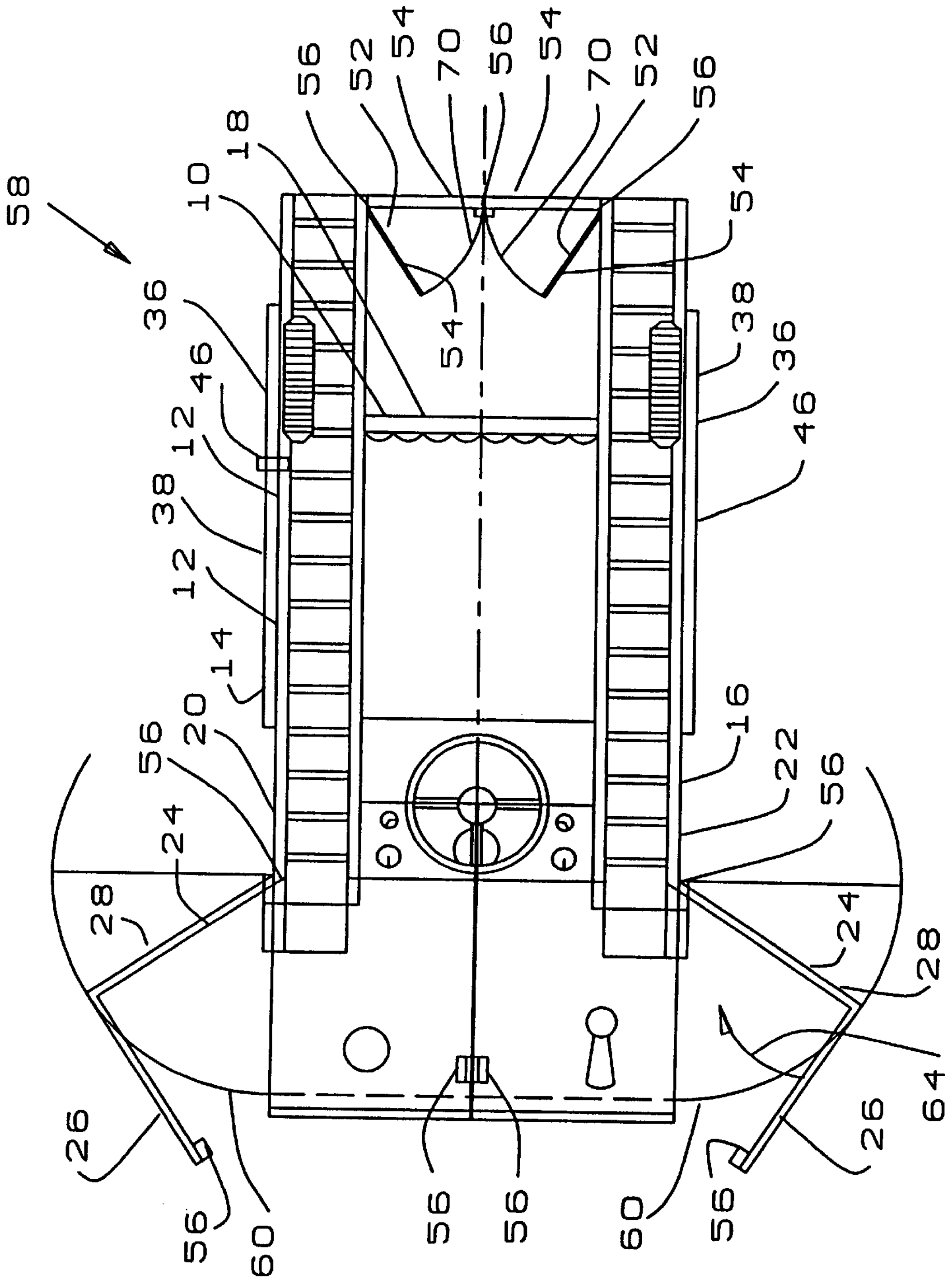
FIG. 6 is a view similar to that of FIG. 5 showing the front and rear portions of the decorative shell opened to facilitate folding of the wheelchair for storage or transportation.

In use, the body shell 58 is mounted to enclose a wheelchair 10 and the side panels 14 and 16 are secured to the frame 18 of the wheelchair 10 by suitable means, such as machine screws, bolts or the like, not shown. In the normal position, the lateral sections 26, horizontal sections 28 and rear sections 54 of side panel 14 will extend toward the corresponding components of side panel 16 and will be releasably secured together by suitable means, such as magnetic latches 56. Consequently, the body shell 58 will substantially enclose the wheelchair 10 to simulate the appearance of a desired vehicle. To allow a patient to enter the wheelchair 10, the horizontal front sections 28 are swung upwardly, outwardly and downwardly, to like adjacent the outside of the extension front sections 24, as seen in FIG. 6, and the extension front sections 24 are swung open, as indicated by arrows 60. This opens the entire forward area of the wheelchair 10 to allow the patient to enter the wheelchair 10 in a normal manner. When the patient is seated on the seat 62 of the wheelchair 10 and their feet have been placed on the footrest 30, the extension front sections 24 and horizontal front sections 28 are returned to the closed positions, providing the appearance that the patient is seated within the simulated vehicle. The patient may then maneuver the wheelchair in a conventional manner, by appropriate manipulation of the handwheels 38. It will be seen that, when closed, the extension front sections 24 and horizontal front sections 28 serve to enclose the legs and lower torso of a person seated on the seat 62 and, hence serve to protect the person's legs and lower torso against possible injury due to collision or falling objects, while leaving the person's upper torso and arms free for reaching and other uses and providing unobstructed access for the person's hands to reach and manipulate the wheels of the wheelchair. On the other hand, when the extension front sections 24 and horizontal front sections 28 are open, the person has unobstructed access for entering and leaving the seat 62 of the wheelchair. Also, the patient may actuate the rotating light 32 and siren 34 in accordance with the play action suggested by the appearance of the vehicle simulated by the body shell 58. For storage or transportation, the horizontal front sections 28 are folded over outside of the extension front sections 24 and the lateral front sections 26 are folded inwardly, as indicated by arrows 64 to lie adjacent the inside of the extension sections 24. Also, the rear sections 52 are folded inwardly to lie adjacent the outside of the rear end 54 of the side panels 14 and 16. Thereafter, the wheelchair 10 may be collapsed in a conventional manner for storage or transportation, with the body shell 58 occupying little, if any, additional space.

Figure 7:
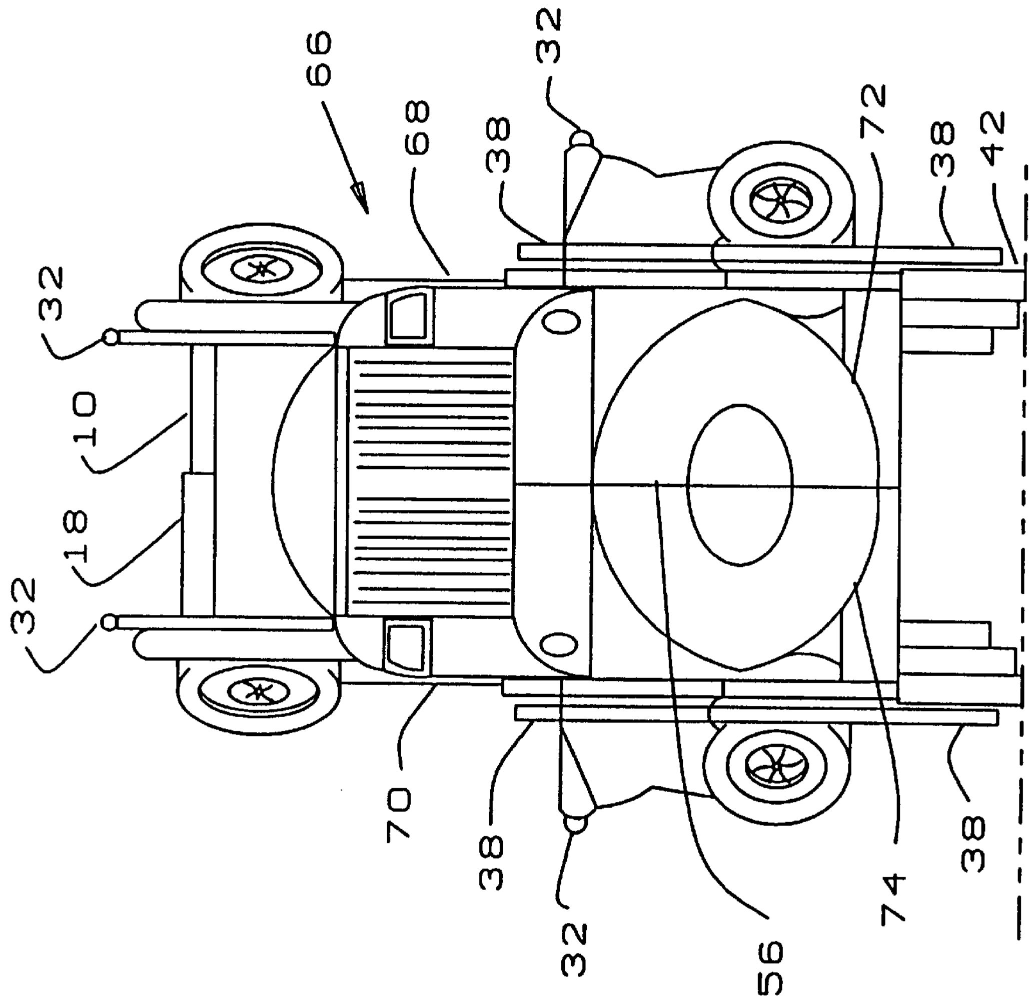
FIG. 7 is a front view of an alternative form of the decorative body shell of FIG. 1.
Figure 8:
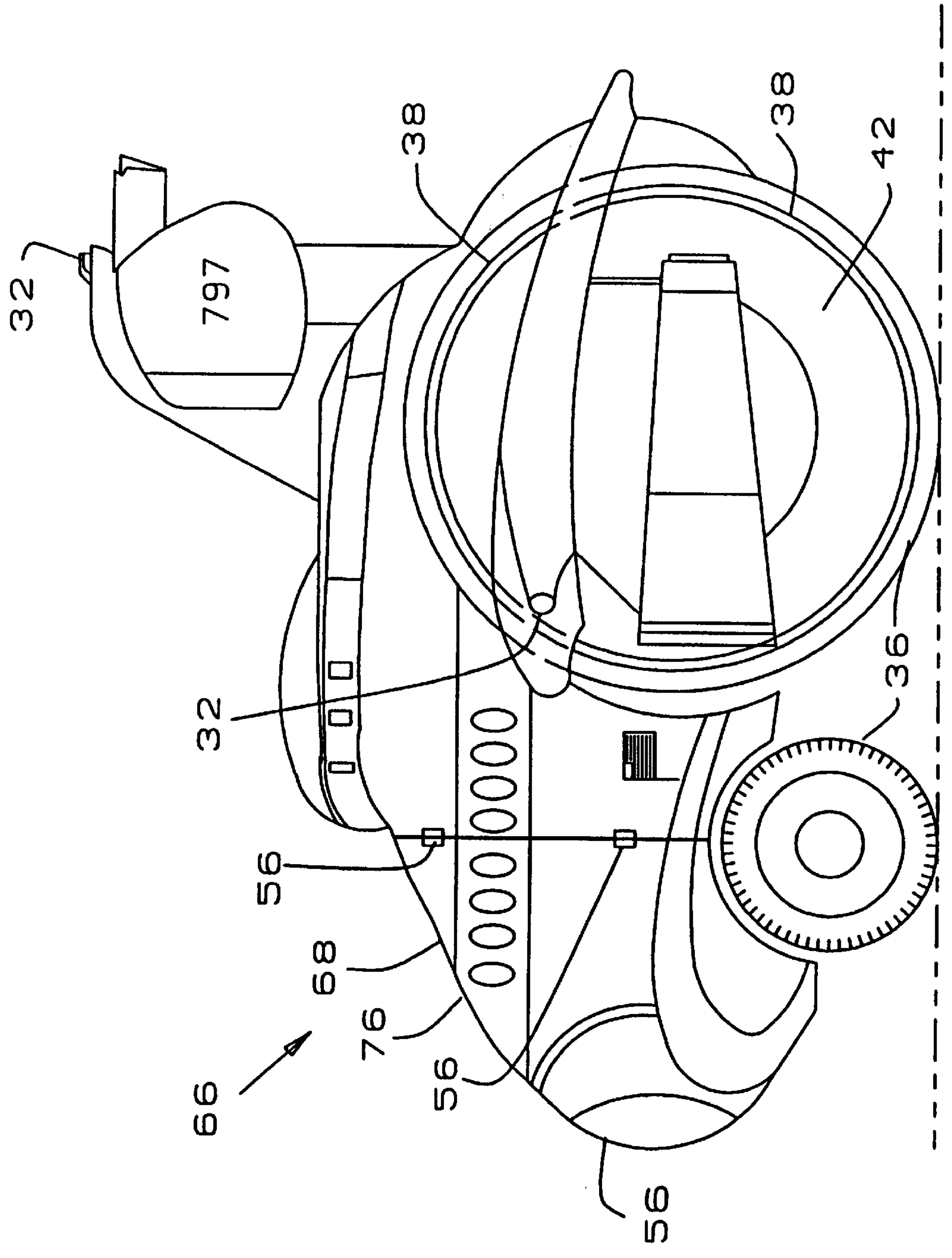
FIG. 8 is a side view of the body shell of FIG. 7.

FIGS. 7 and 8 show an alternative form of body shell, indicated generally at 66, simulating the appearance of an aircraft. The aircraft body shell 66 is comprised of side panels 68 and 70 which are secured to the frame 18 of the wheelchair 10 by suitable means, such as machine screws, bolts or the like, not shown, to enclose the wheelchair 10 in substantially the same manner as described above with respect to the fire engine body shell 58 of FIGS. 1–3. In this form of the present invention, semi-conical front sections 72 and 74 are hingedly connected to the front ends 76 of the side panels 68 and 70, respectively, to enclose the footrest 30 and front end of the wheelchair 10 and to simulate the nose of an airplane. The adjacent edges of the semi-conical front sections 72 and 74 may be releasably secured together by suitable means, such as magnetic latches 56. To allow the patient to enter the wheelchair 10, the semi-conical front sections 72 and 74 are swung open and apart to allow free access to the wheelchair 10 and seat 62. For storage and transportation, the semi-conical front sections 72 and 74 may be opened, as for allowing entry to the wheelchair, or may by removed and stored separately, due to their additional bulk.

Obviously, different body shells may be provided which simulate numerous different types of vehicles, such as automobiles, trucks, military vehicles, boats, etc., substantially as desired. In addition, numerous other variations and modifications can obviously be made without departing from the spirit of the present invention. Therefore, it should be clearly understood that the forms of the present invention described above and shown in the figures of the accompanying drawings are illustrative only and are not intended to limit the scope of the present invention.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A device for providing a decorative appearance for a wheelchair including a frame with a footrest, a seat having a front edge and wheels mounted on said frame, said device comprising:

a body shell mountable on said frame and having a section hingedly connected thereto and movable between a first position normally extending laterally to said wheelchair in front of said footrest and a second position allowing unobstructed access to said footrest and said seat by way of said front edge of said seat, the section of the body shell substantially enclosing the footrest of the wheelchair in the first position to provide protection to an individual's lower body, said body shell has side sections and rear sections for enclosing the rear of said wheelchair, said rear sections being hingedly connected to said side sections so that said device is foldable for storage and transportation.

2. The device of claim 1 wherein:

said body shell simulates the appearance of a vehicle.

3. The device as claimed in claim 1 wherein the body shell is formed of a substantially rigid material contoured to provide a three-dimensional appearance.

* * * * *